United States Patent
Hekmatshoartabari et al.

(10) Patent No.: US 12,518,153 B2
(45) Date of Patent: Jan. 6, 2026

(54) TRAINING MACHINE LEARNING SYSTEMS

(71) Applicant: International Business Machines Corporation, Armonk, NY (US)

(72) Inventors: Bahman Hekmatshoartabari, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 16/739,694

(22) Filed: Jan. 10, 2020

(65) Prior Publication Data
US 2021/0216858 A1    Jul. 15, 2021

(51) Int. Cl.
*G06N 3/08*      (2023.01)
*G06F 30/27*     (2020.01)
*G06N 3/063*     (2023.01)
*G06N 7/00*      (2023.01)

(52) U.S. Cl.
CPC ............... *G06N 3/08* (2013.01); *G06F 30/27* (2020.01); *G06N 3/063* (2013.01); *G06N 7/00* (2013.01)

(58) Field of Classification Search
CPC . G06N 3/08; G06N 7/00; G06N 3/063; G06F 30/27
See application file for complete search history.

(56) References Cited

U.S. PATENT DOCUMENTS

| | | | |
|---|---|---|---|
| 2017/0228637 A1* | 8/2017 | Santoro | G06N 3/0445 |
| 2017/0351941 A1 | 12/2017 | Mishra | |
| 2017/0362585 A1 | 12/2017 | Wang | |
| 2018/0286386 A1 | 10/2018 | Baughman | |
| 2018/0293711 A1 | 10/2018 | Vogels | |
| 2018/0314163 A1* | 11/2018 | Liu | G06F 30/20 |
| 2018/0373982 A1 | 12/2018 | Salakhutdinov | |
| 2019/0137987 A1 | 5/2019 | Cella | |
| 2021/0034969 A1* | 2/2021 | Wayne | G06N 3/084 |
| 2021/0158224 A1* | 5/2021 | Tanaka | G06N 5/01 |

OTHER PUBLICATIONS

Caglar Gulcehre, Sarath Chandar, and Yoshua Bengio, arXIv: 1701.08718v1 (Year: 2017).*
Tsendsuren Munkhdalai, et.al, 2019, arXiv:1907.09720v2 [cs.NE] Dec. 3, 2019 (Year: 2019).*
Alex Graves, et.al, Hybrid computing using a neural network with dynamic external memory, Nature, vol. 538, Oct. 2016. (Year: 2016).*
"Neural Turing machine", From Wikipedia, the free encyclopedia, This page was last edited on Aug. 2, 2019, 2 pages.
(Continued)

*Primary Examiner* — Li B. Zhen
*Assistant Examiner* — Tirumale K Ramesh
(74) *Attorney, Agent, or Firm* — David K. Mattheis

(57) ABSTRACT

Training machine learning systems using a training data set, gradient descent, and a loss function. The machine learning system includes memory and reads and writes to memory according to read and write profiles. The loss function is associated with machine learning system memory read and write profile gradients. The loss function includes a loss function penalty term, the loss function penalty term being associated with the read and write profile gradient differences. Trained machine learning systems are then provided.

20 Claims, 4 Drawing Sheets

(56) References Cited

OTHER PUBLICATIONS

Collier et al., "Implementing Neural Turing Machines," In Artificial Neural Networks and Machine Learning—ICANN 2018, LNCS 11141, pp. 94-104, © Springer Nature Switzerland AG 2018.
Graves et al., "Hybrid computing using a neural network with dynamic external memory", Nature, vol. 538, Oct. 27, 2016, 21 pages, doi:10.1038/nature20101.
Graves et al., "Neural Turing Machines", Google DeepMind, London, UK, arXiv:1410.5401v2 [cs.NE] Dec. 10, 2014, 26 pages.
Lecun et al., "Deep learning," Nature, vol. 521, May 28, 2015, pp. 436-444, doi:10.1038/nature14539.
Mell et al., "The NIST Definition of Cloud Computing", Recommendations of the National Institute of Standards and Technology, Special Publication 800-145, Sep. 2011, 7 pages.
Mizrahi, Alice, "Stochastic magnetic tunnel junctions for bioinspired computing", PhD dissertation, Submitted on Mar. 21, 2017, Université Paris-Saclay, NNT: 2017SACLS006, 243 pages.
Rae et al., "Scaling Memory-Augmented Neural Networks with Sparse Reads and Writes", 30th Conference on Neural Information Processing Systems (NIPS 2016), Barcelona, Spain, arXiv:1610.09027v1 [cs.LG] Oct. 27, 2016, 17 pages.
Wu et al., "The Kanerva Machine: A Generative Distributed Memory," published as a conference paper at ICLR 2018, arXiv:1804.01756v3 [stat.ML] Jun. 18, 2018, 16 pages.

\* cited by examiner

TRAINING MACHINE LEARNING SYSTEMS

BACKGROUND

The disclosure relates generally to training machine learning systems utilizing trainable controllers for access to memory. A trainable controller may be comprised of a neural network. The disclosure relates particularly to training such machine learning systems while suppressing the tendency of those machine learning systems to converge into local minima. Examples of such a machine learning system may include but are not limited to a Neural Turing Machine (NTM) or a Differentiable Neural Computer (DNC).

A well-trained machine learning system has reached a state corresponding to the global, rather than a local, minimum of the loss function used for training the machine learning system. With respect to machine learning systems with trainable memory controllers, a well-trained system operating close to the global minimum has learned a sufficiently distributed representation of the training data and therefore utilizes a wide range of memory locations for read and write operations, whereas a poorly trained system operating close to a loss function local minimum may utilize only a fraction of available memory locations or even collapse reading and writing into a single memory location. As an important consequence of the above, well-trained networks are capable of generalization. For instance, well-trained networks are capable of making accurate predictions on working data instances having sequence lengths much longer than that of training data instances, while poorly trained networks do not generalize well to working data which differ substantially from training data.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable training machine learning systems using modified loss functions, thereby preventing convergence of the machine learning system on a loss function local minimum.

Aspects of the invention disclose methods, systems and computer readable media associated with training machine learning systems using a training data set, gradient descent, and a loss function. The machine learning system includes memory and reads and writes to memory according to read and write profiles. The loss function is associated with machine learning system memory read and write profile gradients. The loss function includes a loss function penalty term, the loss function penalty term is associated with the read and write profile gradient differences. Trained machine learning systems are then provided.

In one aspect, methods, systems and computer readable media associated with improving the training of machine learning systems by applying a loss function penalty term during the training. The loss function penalty term is associated with the magnitude of at least one of the read and write profile gradients pertaining to memory access.

In one aspect, methods, systems and computer readable media associated with improving the training of machine learning systems by detecting a convergence upon a loss function local minimum and reinitializing the system training process.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
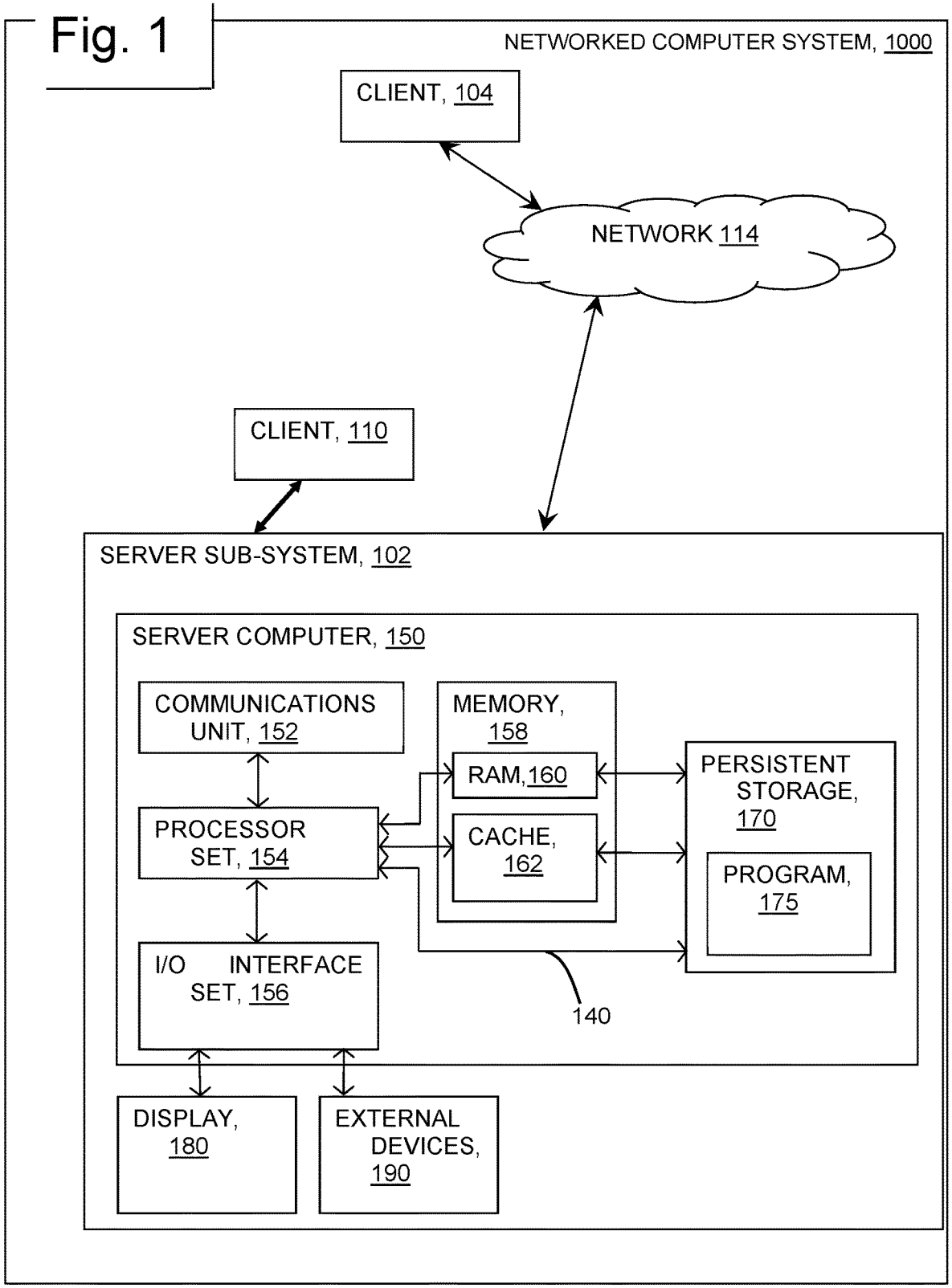
FIG. 1 provides a schematic illustration of a system, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., end-to-end training of a machine learning network coupled to external memory utilizing expanded loss functions, detecting convergence of machine learning systems around loss function local minima during training activities, etc.). These solutions are not abstract and cannot be performed as a set of mental acts by a human due to the processing capabilities needed to facilitate machine learning system training without loss function local minimum issue, for example. Further, some of the processes performed may be performed by a specialized computer for carrying out defined tasks related to memory operations. For example, a specialized computer can be employed to carry out tasks related to training neural network-based machine learning systems, or the like.

Artificial intelligence or machine learning systems can be enhanced by coupling neural networks to external memory components. Such neural networks are often referred to as memory-augmented neural networks or memory networks. The basic operations, logical control flow and memory read/write operations may each be trained as part of the system training using gradient descent methodologies.

A Neural Turing Machine (NTM) consists of a neural network controller coupled to an external memory. An NTM may be trained to perform programmed tasks such as copy, repeat copy and associative recall. In a copy task, the system learns to store and subsequently output an input stream of data. In a repeat copy task, the system learns to store and output a defined or learned number of copies of the input data stream. In a recall task, the system learns to return an output associated with a particular input after selecting the output from a list based upon the input value.

The controller receives external input vectors and provides external output vectors according to the weightings of the network nodes. The controller also reads and writes to the memory according to the node weightings. Parameterized read and write heads control the interactions of the controller with the memory during training and NTM use. During read and write operations, the network interacts with all memory locations to a greater or lesser extent according to a focus determined by the node weightings. During training, training data set input vectors are provided and the NTM learns to perform the target task using gradient descent to modify the node weightings associated with the read and write operations. During use the now defined node weightings enable the NTM to perform the target task. As an example, by using gradient descent-based network training, the NTM learns to receive and copy an input vector, or to receive and repeat copy the input vector.

Training the network weightings using a typical loss function can yield read and write activity which becomes focused on a limited range of memory, or even a single memory address or slot due to a collapse of the training gradient descent upon a local, rather than global, minimum. An NTM trained to focus upon a local loss function minimum typically generalizes poorly to input vectors which differ from those of the training data set. For example, such a poorly trained NTM would not perform well in use when receiving 20-bit input vectors after successfully being trained to a loss function local minimum using a training data set having 8-bit vectors. Disclosed embodiments provide methods to train the NTM to generalize from a training data set to a broader data set which requires preventing the NTM from converging into a loss function local minimum during training.

In an embodiment, the controller comprises a long short-term memory (LSTM) neural network, though feed-forward networks may also be used. In an embodiment, the controller node weights for input/output,read/write, and other system parameters can be trained using gradient descent methods.

In an embodiment,read and write operations initially consider all available memory component locations. As training progresses, read and write weightings change as do network node weightings associated with input and outputs. Gradient descent according to a defined loss function results in a trained system where particular inputs yield predictable outputs according to the trained system gradients and weightings. Monitoring the weightings and gradients as training progresses enables embodiments of the invention to identify instances wherein the machine learning system is focusing on local rather than global minima of the loss function.

In an embodiment, the loss function used to train the NTM comprises a typical loss function (e.g., a cross-entropy loss function associated with the difference between the produced output and the target output) as a target loss, plus a factor related to the difference between the read operations gradient and the write operations gradient. This factor penalizes the network as the read and write gradients differ—an indication that the network is approaching loss function local minima. As an example, $$\text{Loss} = \text{Target Loss} + \frac{1}{\text{batch size}} \frac{1}{N^2} \sum_t (\text{Grad}_{t,read} - \text{Grad}_{t,write})^2$$

where $$\begin{cases} \text{Grad}_{t,read} = \underset{n_{RH}}{\text{mean}}\left(\widetilde{\text{diff}}_t\left[\underset{n_N}{\text{argmax}}(w_{t,read})\right]\right) \\ \text{Grad}_{t,write} = \underset{n_{NW}}{\text{mean}}\left(\widetilde{\text{diff}}_t\left[\underset{n_N}{\text{argmax}}(w_{t,write})\right]\right) \end{cases}$$

In this example, N is number of memory locations ($1 \leq n_N \leq N$); $N_{RH}$ is number of read heads ($1 \leq n_{RH} \leq N_{RH}$); $N_{WH}$ is number of write heads ($1 \leq n_{WH} \leq N_{WH}$), t represents time, and $\widetilde{\text{diff}}_t$ represents the discrete difference diff after removing or correcting memory wraparounds.

Memory wraparound occurs in a memory matrix during a write operation when written data reaches a matrix edge and wraps around to the next row of the matrix. In reading the data, the system must account for this wraparound by reading around the edge to the next row while looking for patterns in the data, rather than interpreting the break in the data caused by the end of row wrap around as part of a pattern.

As a non-limiting example, memory wraparounds can be accounted for by applying the modulus of N or −N to the discrete difference:

$$\widetilde{\text{diff}}_t(.) = \text{diff}_t(.) \bmod N \text{ or } \widetilde{\text{diff}}_t(.) = \text{diff}_t(.) \bmod (-N)$$

This is depicted in the following three examples, where N=128 and $N_{RH}=N_{WH}=1$ (mod 128 or mod-128 may be used in each of the following cases):

Example 1, read and write gradients are identical, no penalty in the loss function:

$$\underset{n_N}{\arg\max}(w_{t,read}) = [125, 126, 127, 128,$$
$$1, 2, 3] \overset{\text{diff}}{\rightarrow} [1, 1, 1, -127, 1, 1] \overset{\text{mod }128}{\longrightarrow} [1, 1, 1, 1, 1, 1]$$
$$\underset{n_N}{\arg\max}(w_{t,write}) =$$
$$[99, 100, 101, 102, 103, 104, 105] \overset{\text{diff}}{\rightarrow} [1, 1, 1, 1, 1, 1] \overset{\text{mod }128}{\longrightarrow}$$
$$[1, 1, 1, 1, 1, 1] \rightarrow \sum_t (\text{Grad}_{t,read} - \text{Grad}_{t,write})^2 = 0$$

Example 2, substantial read-write gradient difference due to local minima:

$$\underset{n_N}{\arg\max}(w_{t,read}) =$$
$$[125, 126, 127, 128, 1, 2, 3] \overset{\text{diff}}{\rightarrow} [1, 1, 1, -127, 1, 1] \overset{\text{mod }128}{\longrightarrow} [1, 1, 1, 1, 1, 1]$$
$$\underset{n_N}{\arg\max}(w_{t,write}) =$$
$$[5, 4, 3, 2, 1, 128, 127] \overset{\text{diff}}{\rightarrow} [-1, -1, -1, -1, 127, -1] \overset{\text{mod }128}{\longrightarrow}$$
$$[127, 127, 127, 127, 127, 127] \rightarrow \sum_t (\text{Grad}_{t,read} - \text{Grad}_{t,write})^2 = 6 \times 126^2$$

Example 3, substantial read-write gradient difference due to local minima:

$$\underset{n_N}{\arg\max}(w_{t,read}) = [125, 126, 127, 128, 1, 2, 3]$$
$$\overset{\text{diff}}{\rightarrow} [1, 1, 1, -127, 1, 1] \overset{\text{mod }-128}{\longrightarrow} [-127, -127, -127, -127, -127 -127]$$
$$\underset{n_N}{\arg\max}(w_{t,write}) =$$
$$[5, 4, 3, 2, 1, 128, 127] \overset{\text{diff}}{\rightarrow} [-1, -1, -1, -1, 127, -1] \overset{\text{mod }-128}{\longrightarrow} [-1,$$
$$-1, -1, -1, -1, -1,] \rightarrow \sum_t (\text{Grad}_{t,read} - \text{Grad}_{t,write})^2 = 6 \times 126^2$$

In the above examples, arg max of read weightings at time t ($W_{t,read}$) with respect to $n_N$ is given for 7 time steps. For example, at t=0, the maximum of the read weightings is associated with memory location 125 meaning that the read head is focused primarily on reading from memory location 125, whereas, for example, at t=1, the primary read focus is on memory location 126. In above examples, argmax of write weightings is also given for 7 time steps. For example, at t=2, the focus of the write head in Example 1 is primarily on memory location 101 and the focus of the write head in Example 2 and Example 3 is primarily on memory location 3. A suitable number of time steps for calculating gradients may be equal to, for example, the length (duration) of a data instance.

In an embodiment, a modified loss function as described above is beneficial for suppressing convergence into local minima while training a machine learning system for performing tasks such as copy, repeat copy and associative recall. In a copy task, the system learns to store and subsequently output an input stream of data. In a repeat copy task, the system learns to store and output a defined or learned number of copies of the input data stream. In a recall task, the system learns to return an output associated with a particular input after selecting the output from a list based upon the input value. In one example, a list of values is provided, and the system learns to receive an item on the list as input and then provide the next item on the list as output.

It will be appreciated that a modified loss function as described above may be adjusted based on the specifics of the task for which a machine learning system is trained. For example, in an embodiment where the system is trained to perform a reverse copy task by storing an input data stream and subsequently outputting a data stream in reverse order compared to the input data stream, learning a distributed representation corresponds to read and write profiles in opposite time directions and therefore gradients with opposite signs. As such, a modified loss function, such as, for example as described below may be used for a reverse copy task:

$$\text{Loss} = \text{Target Loss} + \frac{1}{\text{batch size}} \frac{1}{N^2} \sum_t (\text{Grad}_{t,read} - \text{Grad}_{t,write})^2$$

In an embodiment, the training loss function is modified by adding a term associated with the magnitude of at least one of the read and write gradients. The combination of both read and write gradient magnitudes may be used as well. Adding the gradient magnitude term to the loss function penalizes repeated reads/writes to the same memory slot which correspond to read/write gradients close to zero.

As an example,

Loss =

$$\text{Target Loss} - \frac{1}{\text{batch size}} \frac{1}{N^2} \left[ \log \sum_t (\text{Grad}_{t,read})^2 + \log \sum_t (\text{Grad}_{t,write})^2 \right]$$

where $$\sum_t (\text{Grad}_{t,read/write})^2 = \text{minimum}\left[ \sum_t (\text{Grad}^+_{t,read/write})^2, \sum_t (\text{Grad}^-_{t,read/write})^2 \right]$$

and $$\begin{cases} \text{Grad}^+_{t,read/write} = \underset{n_{RH}/n_{WH}}{\text{mean}} \left\{ \underset{t}{\text{diff}} \left[ \frac{\text{argmax}(w_{t,read/write})}{n_N} \right] \mod N \right\} \\ \text{Grad}^-_{t,read/write} = \underset{n_{RH}/n_{WH}}{\text{mean}} \left\{ \underset{t}{\text{diff}} \left[ \frac{\text{argmax}(w_{t,read/write})}{n_N} \right] \mod (-N) \right\} \end{cases}$$

In an embodiment, the machine learning system loss function includes both the read/write gradient difference term and one or both of the read/write gradient magnitude terms.

In an embodiment, the training of the machine learning system progresses through a predetermined number of iterations. A user defines either a set number of iterations as a threshold, or a percentage drop in loss threshold. At the threshold, the current values of the read and/or write gradients are evaluated against a gradient threshold. Gradient values below the set threshold indicate systems converging on local minima. System training restarts for such systems, for example, by reinitializing the weights to small random values and restarting gradient descent. In an embodiment, the signs of the gradients are compared. Systems having read and write gradients with opposite signs while training for a task such as copy, repeat copy and associative recall are identified as converging on local minima and training of these systems restarts. In an embodiment, systems having read and write gradients with same signs while training for a task such as reverse copy are identified as converging on local minima and training of these systems restarts.

In an embodiment, the check for convergence on local minima according to either gradient values or gradient sign comparisons combines with evaluating the difference between gradient values to identify systems converging upon local minima. Training of identified systems restarts if the check fails.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise machine learning training program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning training program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning training program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
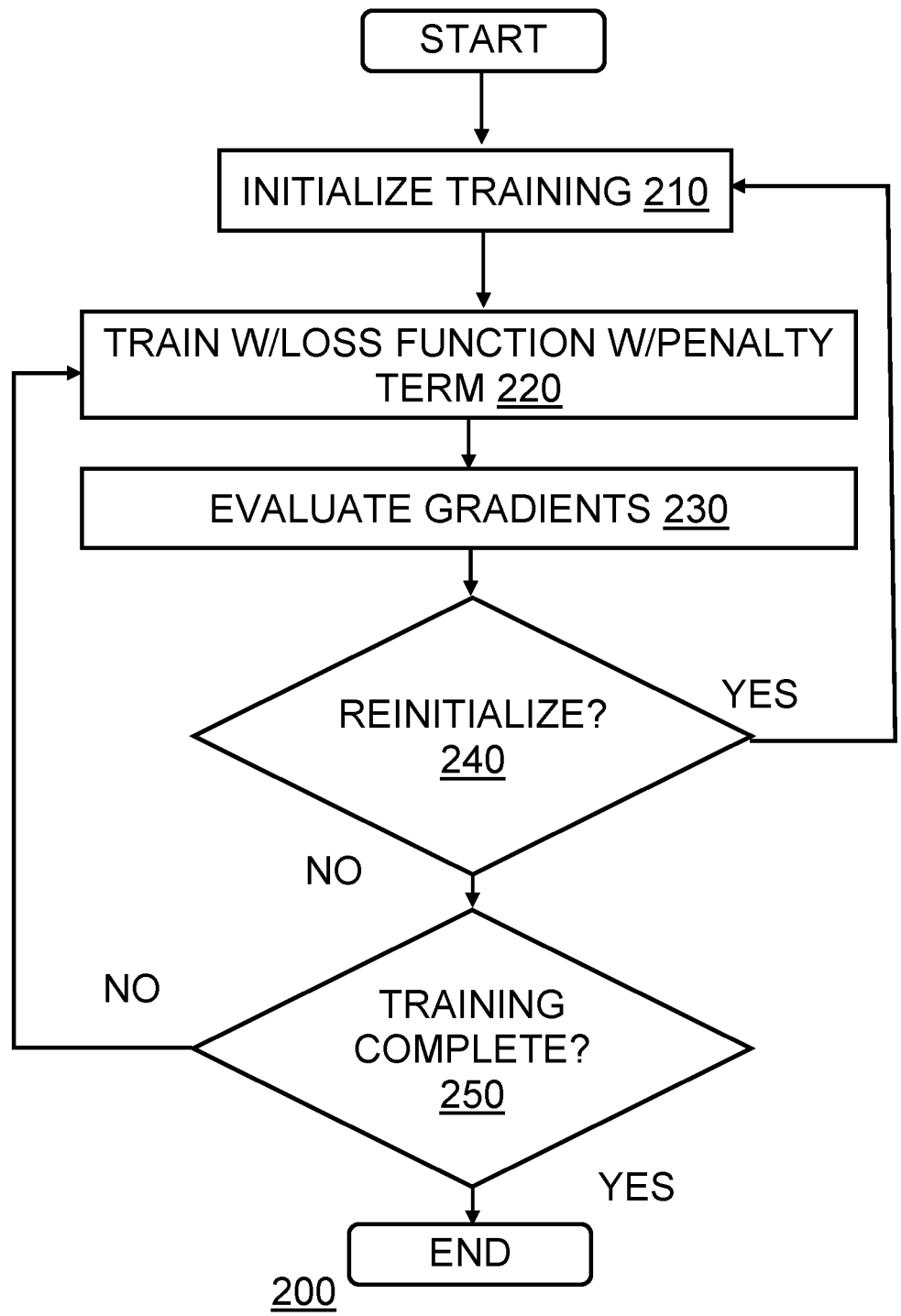
FIG. 2 provides a flowchart depicting an operational sequence, according to an embodiment of the invention.

FIG. 2 provides a flowchart 200, illustrating exemplary activities associated with the practice of the disclosure. After program start, at block 210, the machine learning training program 175 initializes training of an NTM machine learning system. At block 220, training proceeds using a loss function having a gradient associated penalty term. In an embodiment, the penalty term is associated with a difference of the read and write gradients of the NTM system. In an embodiment, the term includes the sum of the squares of the read gradient minus the write gradient. In this embodiment, the training program suppresses the tendencies of machine learning system to converge on local, rather than global, minima.

In an embodiment, machine learning training program 175 conducts training of a machine learning system using a loss function including a penalty term associated with the magnitude of either the read gradient, the write gradient, or both the read and write gradients. In this embodiment, the training suppresses the system training tendencies to read and write to a single memory slot.

At block 230, machine learning training program 175 evaluates training progress after a defined number of training iterations, or a defined drop in loss values. Read and/or write gradient values are evaluated. In an embodiment, read and write gradients below a defined gradient threshold indicate convergence upon local minima and training reinitializes. In an embodiment, read and write gradient signs are compared. At decision point 240, unfavorable comparisons-matched signs when opposing signs are desired, or opposing signs when matched signs are desired-result in training reinitialization, and favorable comparisons lead to decision point 250 where training is evaluated for completeness. Completeness is determined according to changes in loss over recent iterations. Successive iterations which do not alter the loss indicate complete training. Loss values changing with each iteration indicate incomplete training.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
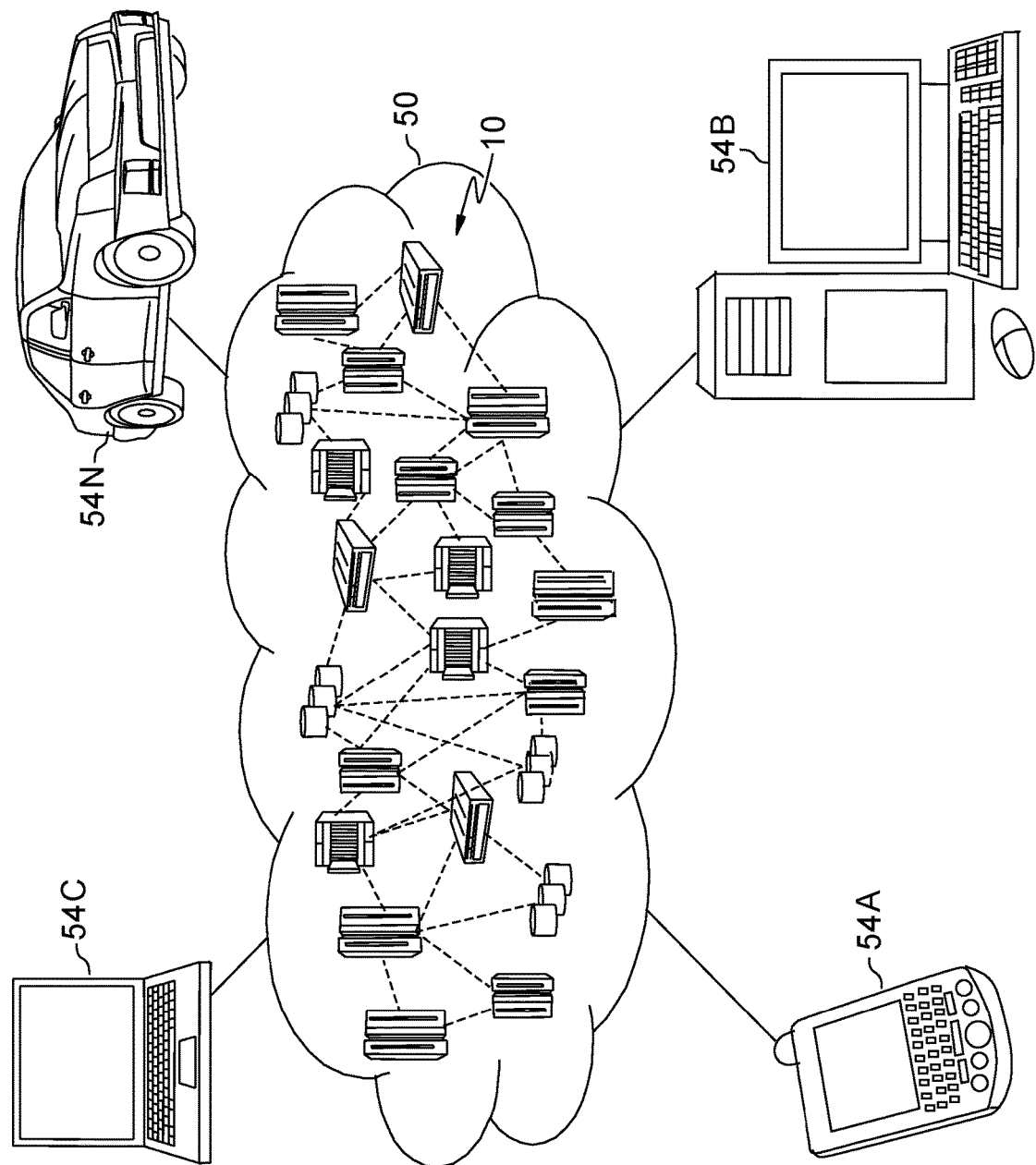
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
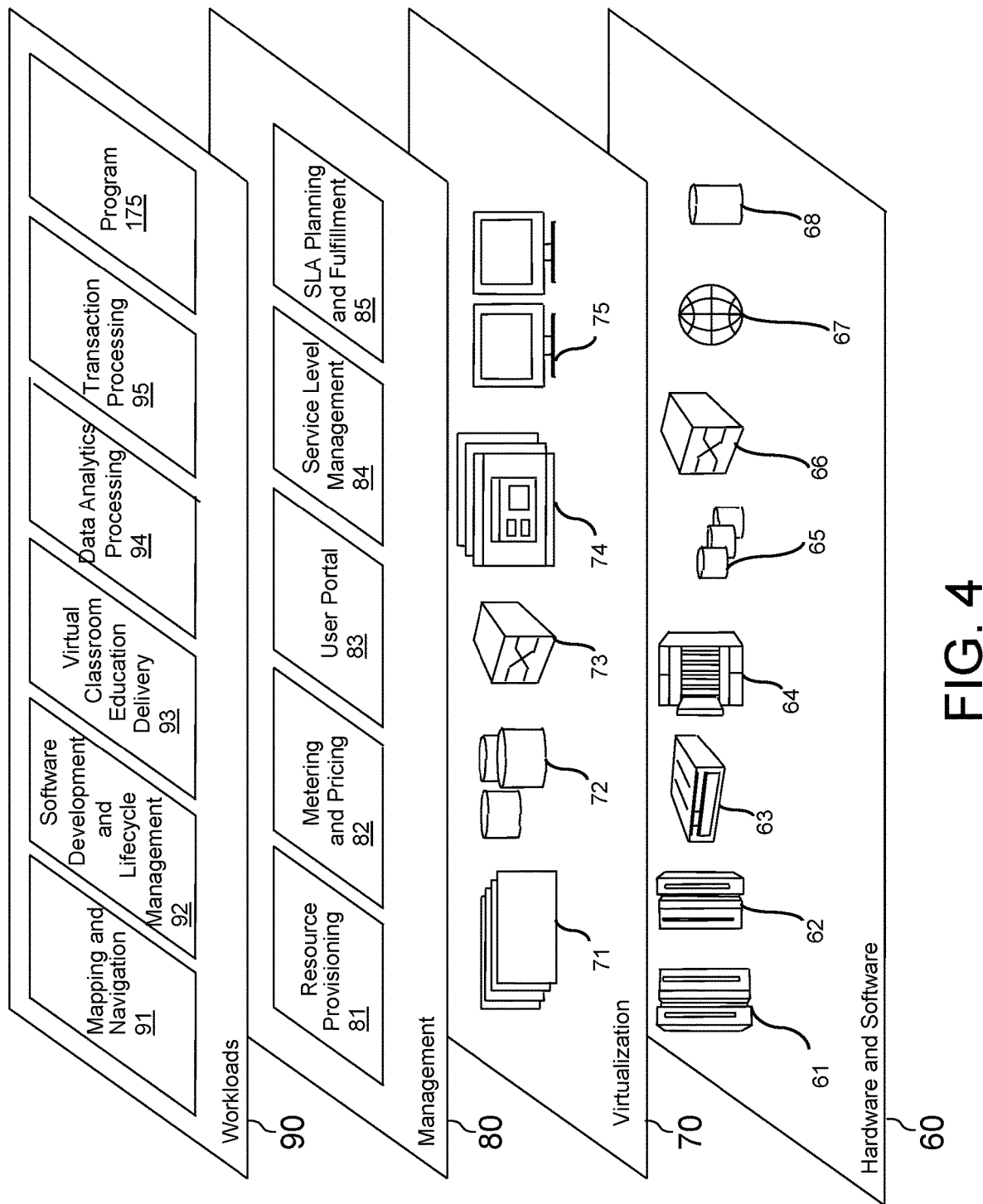
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning training program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for training machine learning system, the method comprising:
   initializing machine learning system training, using a training data set, gradient descent, and a loss function, wherein a machine learning system comprises memory and wherein the machine learning system reads and writes to memory according to read profiles and write profiles and wherein the loss function is associated with a machine learning system memory read profile gradient derived from changes in a read head memory location focus during read operations and a write profile gradient derived from changes in a write head memory location focus during write operations,
   wherein the loss function includes a loss function penalty term, the loss function penalty term comprising a difference between the read profile gradient and the write profile gradient, and providing the trained machine learning system.

2. The computer implemented method according to claim 1, further comprising:
   detecting a loss function local minimum; and
   reinitializing the training.

3. The computer implemented method according to claim 1, further comprising applying a second loss function penalty term, wherein the second loss function penalty term is associated with a calculated magnitude of a read operation gradient.

4. The computer implemented method according to claim 1, further comprising applying a third loss function penalty term, wherein the third loss function penalty term is associated with a calculated magnitude of a write operation gradient.

5. The computer implemented method according to claim 1, wherein the machine learning system comprises a Neural Turing Machine.

6. The computer implemented method according to claim 1, wherein the machine learning system comprises a memory-augmented neural network.

7. The computer implemented method according to claim 1, wherein the machine learning system comprises a differentiable neural computer.

8. A computer program product for training machine learning systems, the computer program product comprising one or more computer readable storage medium and stored program instructions on the one or more computer readable storage medium, the stored program instructions comprising:
   program instructions to initialize training of a machine learning system using a training data set, gradient descent, and a loss function, the loss function associated with a machine learning system memory read profile gradient derived from changes in a read head memory location focus during read operations and a write profile gradient derived from changes in a write head memory location focus during write operations, wherein the machine learning system comprises memory, wherein the machine learning system reads and writes to memory according to read profiles and write profiles,
   wherein the loss function includes a loss function penalty term, the loss function penalty term includes a difference between the read profile gradient and the write profile gradient; and
   program instructions to provide the trained machine learning system.

9. The computer program product according to claim 8, the stored program instructions further comprising:
   program instructions to detect a loss function local minimum; and
   program instructions to reinitialize the training.

10. The computer program product according to claim 8, the stored program instructions further comprising program instructions to apply a second loss function penalty term, wherein the second loss function penalty term is associated with calculated magnitude of a read gradient.

11. The computer program product according to claim 8, the stored program instructions further comprising program instructions to apply a third loss function penalty term, wherein the third loss function penalty term is associated with a calculated magnitude of a write gradient.

12. The computer program product according to claim 8, wherein the machine learning system comprises a neural Turing machine.

13. The computer program product according to claim 8, wherein the machine learning system comprises a memory-augmented neural network.

14. The computer program product according to claim 8, wherein the machine learning system comprises a differentiable neural computer.

15. A computer system for managing application execution, the computer system comprising:
   one or more computer processors;
   one or more computer readable storage medium; and
   stored program instructions on the one or more computer readable storage medium for execution by the one or more computer processors, the stored program instructions comprising:
   program instructions to initialize training of a machine learning system using a training data set, gradient descent, and a loss function, the loss function associated with a machine learning system memory read profile gradient derived from changes in a read head memory location focus during read operations and a write profile gradient derived from changes in a write head memory location focus during write operations, wherein the machine learning system comprises memory, wherein the machine learning system reads and writes to memory according to read profiles and write profiles, wherein the loss function includes a loss function penalty term, the loss function penalty term includes a difference between the read profile gradient and the write profile gradient; and program instructions to provide the trained machine learning system.

16. The computer system according to claim 15, the stored program instructions further comprising:

program instructions to detect a loss function local minimum; and program instructions to reinitialize the training.

17. The computer system according to claim 15, the stored program instructions further comprising program instructions to apply a second loss function penalty term, wherein the second loss function penalty term is associated with a calculated magnitude of a read gradient.

18. The computer system according to claim 15, the stored program instructions further comprising program instructions to apply a third loss function penalty term, wherein the third loss function penalty term is associated with a calculated magnitude of a write gradient.

19. The computer system according to claim 15, wherein the machine learning system comprises a neural Turing machine.

20. The computer system according to claim 15, wherein the machine learning system comprises a memory-augmented neural network.

* * * * *